United States Patent [19]

Marshall et al.

[11] Patent Number: 4,477,986
[45] Date of Patent: Oct. 23, 1984

[54] METHOD OF, AND APPARATUS FOR, DETECTING LEAKS

[75] Inventors: Peter E. G. Marshall, Stratford-on-Avon; Francis R. Piper, Evesham; John F. Wilson, Thornbury, all of England

[73] Assignee: BL Technology Limited, England

[21] Appl. No.: 456,039

[22] PCT Filed: May 10, 1982

[86] PCT No.: PCT/GB82/00139
§ 371 Date: Dec. 16, 1982
§ 102(e) Date: Dec. 16, 1982

[87] PCT Pub. No.: WO82/03917
PCT Pub. Date: Nov. 11, 1982

[30] Foreign Application Priority Data

May 8, 1981 [GB] United Kingdom ............... 8114229

[51] Int. Cl.³ ............................................. G01N 3/20
[52] U.S. Cl. ..................................................... 73/40.7
[58] Field of Search ..................... 73/40.7, 37.5, 40

[56] References Cited

FOREIGN PATENT DOCUMENTS 1246278 8/1967 Fed. Rep. of Germany .
2301817 9/1976 France .

OTHER PUBLICATIONS

Rogal, Jet Probe of a Halide Leak Detector, Nov. 1976.

Primary Examiner—Gerald Goldberg
Assistant Examiner—Hezron Williams
Attorney, Agent, or Firm—Hayes, Davis & Soloway

[57] ABSTRACT

A method of, and apparatus for, detecting leaks from a surface provides a sampling device (10) making use of an air curtain (C). The body (11) of the device (10), the curtain (C) and a surface (B) to be tested together define a sampler volume (S). Pressure in the sample volume (S) is regulated to draw signal gas from a source thereof to the volume (S) along leak path (L) which exists. Sampled gas is withdrawn from the volume for checking by means of a mass spectrometer (18) for the presence of signal gas.

5 Claims, 4 Drawing Figures

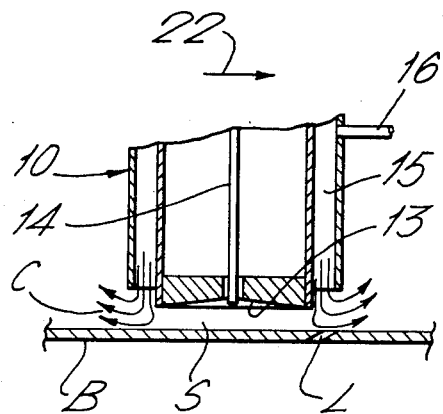
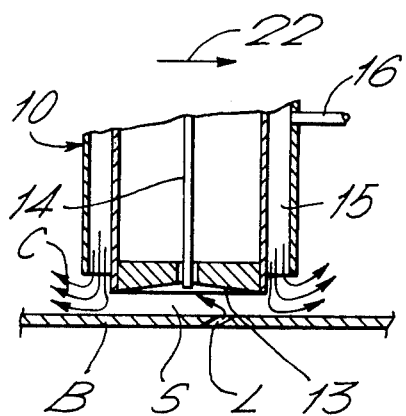
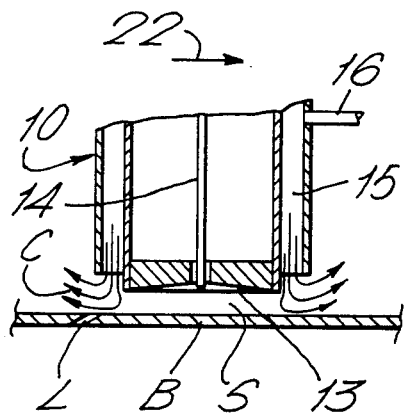

METHOD OF, AND APPARATUS FOR, DETECTING LEAKS

This invention relates to a method of, and apparatus for, detecting leaks. It is particularly, though not exclusively, concerned with detecting leaks that arise in the manufacture of assembled vehicles in the course of production.

According to one aspect of the present invention, there is provided a method of detecting the presence of a leakage path leading to the surface of a fabrication comprising the steps of:

(1) positioning a shrouded sampler above at least part of a surface of a fabrication;
(2) providing a sample of signal gas to the end remote from the surface of a leakage path leading to the surface;
(3) establishing an air curtain between the sampler and the surface by an outflow of air from the sampler, the curtain serving with the sampler and the surface to define a sampling volume;
(4) adjusting the relative axial positions of members which define the air curtain to stabalise the air curtain and to maintain the gas pressure in the sampling volume at a level such that gas adjacent the surface passes to the sampler;
(5) withdrawing a sample of gas from the sampling volume by means of a probe incorporated in the sampler; and
(6) passing the sample through a gas sensor to establish whether signal gas is present or absent.

According to a second aspect of the present invention there is provided an apparatus for detection of a leakage path leading to the surface of a fabrication, the apparatus comprising a sampler which has:

(1) a body;
(2) a probe incorporated in the body whereby a sample of gas can be withdrawn from a sampling volume adjacent an end of the body;
(3) a gas sensing system to detect the presence or absence of a signal gas in the sample;
(4) a shroud disposed about the body to define a continuous gap around the said end of the body;
(5) adjustment means whereby the shroud is adjusted with respect to the body to determine the relative axial positions thereof; and
(6) a plenum chamber from which air, or other gas, can be passed through the continuous gap to establish an air curtain around the sampling volume.

An exemplary embodiment of the invention will now be described with reference to the accompanying drawings in which:

FIGS. 2 to 4 show the sampler of FIG. 1 in use.

Figure 1:
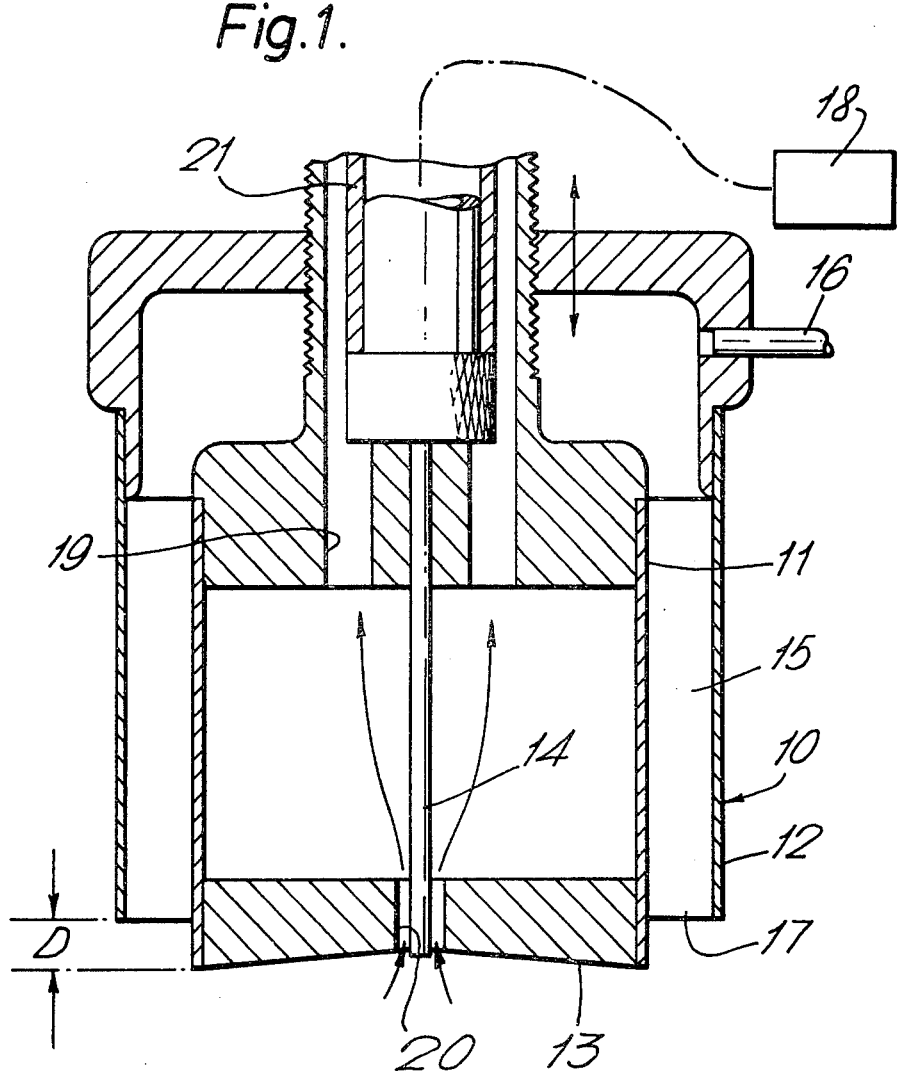
FIG. 1 is a sectional view of a sampler according to this invention.

FIG. 1 shows a shrouded sampler 10 with a body 11 disposed concentrically within a shroud 12 to define an annular gap 17 therebetween. The position of the shroud 12 is adjustable with respect to the body 11 to permit variation, where necessary, in the setting of a margin D between the end of the shroud 12 and an end face 13 of the body 11. In use, values of D of up to 25 mm have been used. The body 11 is circular in cross-section and has extending through it a probe tube 14 by means of which samples of gas in the vicinity of the end face 13 can be withdrawn for passage to a gas sensor 18. The gas sensor 18 is a mass spectrometer adjusted to respond to traces of helium. A plenum chamber 15 between the body 11 and the shroud 12 is supplied with air under pressure by an inlet manifold 16. The passage of air through annular gap 17 from the chamber 15 provides an air curtain C (see FIG. 2) around the end face 13 the use of which will be described hereafter in connection with FIGS. 2 to 4. Gas pressure in the vicinity of the end face 13 is controlled by regulating the rate of diffusion from the air curtain but can also be controlled by means of a vacuum source acting through a duct 19 and a passage 20 in the body 11. The pressure in this area is maintained at a level lower than that causing the gas to be driven along any leak path in a fabrication under test to the vicinity of end face 13. A flexible line 21 couples the sampler 10 to a work station which houses the gas sensor 18.

FIGS. 2 to 4 show the use of the sensor shown in FIG. 1 for detecting a leak in a car body. The car body is generally shown by the designation B and a leak path, which may for example be through a window or door seal, is shown by the designation L. The sampler is initially mounted adjacent the car body B and an air curtain C is established by pressurising air in the chamber 15 so that air is driven out of the annular gap 17. The air curtain C, the end face 13 and the upper surface of the car body B serve to define a sampling volume S. The sampler is driven across the car body surface in the direction shown by arrow 22. FIG. 2 shows the air curtain C about to pass over the upper end of a leak path L in the body B. In this position, the leak path L does not communicate with the sampling volume S.

Prior to the application of the sampler, helium gas was introduced into the car body and diffused throughout the interior thereof by a fan-type system. The interior is slightly pressurised to ensure that the resulting mixture of air and helium within the car body passes along any leak paths, such as leak path L, to the outside of the vehicle. In the situation shown in FIG. 3, air and helium pass along the leak path L from the interior of the body to the sampling volume S. Continuous sampling of gas in the volume S by means of probe 14 thus detects the presence of helium. FIG. 4 discloses the situation when the further movement of the sampler in the direction of arrow 22 results in the air curtain C isolating the sampling volume S from the leak path L. Thereafter, the probe 14 no longer passes air containing traces of helium to the mass spectrometer. The mass spectrometer thus indicates that helium is no longer detected and consequently that the leak is in that part of the car body over which the sampler has passed between the positions shown in FIGS. 2 and 4. The car body B can then be inspected to detect the end of the leak path L and the movement of the sensor can be repeated to confirm visual detection of the end of the leak path L.

The provision of the air curtain C ensures a clear definition of that part of the surface which is being scanned. It also ensures that stray traces of helium outside the car body B do not cause the probe 14 to produce spurious readings. The use of the pressure balancing system within the sampling volume ensures that the tendency is always for gas from the interior of the car to pass to the sampling volume S along a leak path rather than cause gas to be driven in the opposite direction into the car interior.

Once a leak path is detected, the necessary rectification work can be specified.

Helium offers a number of advantages as a signal gas as it can be detected easily, is relatively cheap and is non-toxic. Helium is also compatible with construction materials used in vehicle manufacture and because it has a low density it can be readily dispersed from within a vehicle and the operational area following completion of a test.

Helium is prefereably mixed with air and injected into a vehicle body at a pressure of about half an inch water gauge. In this way sensitivity is improved and the response time for an inspection reduced.

The method is particularly applicable to automatic usage on a vehicle production line. The body is tested prior to final assembly whilst in a partially trimmed state. This facilitates any rectification work which may prove to be necessary. Parts of a body shell such as door seals, windows, boot or tail gate seals and sunshine roof can be tested. Two programs for testing car bodies are envisaged.

In the first program, a car body would be passed through a test area and two manipulators would be programmed to track the body whilst in the test area. Each manipulator would incorporate a leak sensor which would scan the seal areas on one side of the vehicle and also one end. This program would have the advantage that the inspection arrangement would form part of a conventional production line layout. The test procedure would require the provision of a number of components which must be mobile and be programmed to return to the starting position on completion of a test cycle.

In the second program, a static bay would be provided between two moving production lines. On reaching the final station on one line, a car body would be lifted from its track and transferred into the bay. The car body would then be lowered onto a static unit incproporating the leak sensor. Two manipulators, one on each side of the body, would scan the seal areas under test as in the first program. This arrangement has the advantage of a stable datum position and fixed test services. Following the test sequence, the car body would be transferred to the second production line opposite that from which it has been removed.

With either program, leak measurement would be monitored by a micro-processor control unit with preset threshold levels for the signal gas. On detecting a leak, the processer would operate to relate the leak position to a vehicle profile display. Typically, the result would be a print-out of a vehicle diagram together with any necessary fault data.

We claim:

1. A method of detecting the presence of a leakage path leading to the surface of a fabrication comprising the steps of:
   (1) positioning a shrouded sampler above at least part of a surface of a fabrication;
   (2) providing a sample of signal gas to the end remote from the surface of a leakage path leading to the surface;
   (3) establishing an air curtain between the sampler and the surface by an outflow of air from the sampler, the curtain serving with the sampler and the surface to define a sampling volume;
   (4) adjusting the relative axial positions of members which define the air curtain to stabilize the air curtain and to maintain the gas pressure in the sampling volume at a level such that gas adjacent the surface passes to the sampler;
   (5) withdrawing a sample of gas from the sampling volume by means of a probe incorporated in the sampler; and
   (6) passing the sample through a gas sensor to establish whether signal gas is present or absent.

2. An apparatus for detection of a leakage path leading to the surface of a fabrication, the apparatus comprising a sampler which has:
   (1) a body;
   (2) a probe incorporated in the body whereby a sample of gas can be withdrawn from a sampling volume adjacent an end of the body;
   (3) a gas sensing system to detect the presence or absence of a signal gas in the sample;
   (4) a shroud disposed about the body to define a continuous gap around the said end of the body;
   (5) adjustment means whereby the shroud is adjusted with respect to the body to determine the relative axial positions thereof; and
   (6) a plenum chamber from which air, or other gas, can be passed through the continuous gap to establish an air curtain around the sampling volume.

3. An apparatus as claimed in claim 2 in which the said end of the body extends beyond the end of the shroud by a distance of up to 25 mm.

4. An apparatus as claimed in claim 2 having a duct coaxial with the probe whereby gas pressure within the sampling volume can be reduced.

5. An apparatus as claimed in claim 2, in which the gas sensing system comprises a mass spectrometer.

* * * * *